INVENTOR
CHARLES PAVIA

*Albert J. Kramer*

ATTORNEY

June 21, 1960 C. PAVIA 2,941,561
AUXILIARY COMMINUTOR
Filed April 4, 1958 3 Sheets-Sheet 2

INVENTOR
CHARLES PAVIA

BY *Albert J. Kramer*
ATTORNEY

INVENTOR
CHARLES PAVIA

United States Patent Office 2,941,561
Patented June 21, 1960

2,941,561

AUXILIARY COMMINUTOR

Charles Pavia, Timberville, Va.

Filed Apr. 4, 1958, Ser. No. 726,532

13 Claims. (Cl. 146—182)

This invention relates to auxiliary comminutors for the purpose of reducing to sub-cellular size larger particles of cellular material, such as meat, fat, vegetables, and other materials.

An object of this invention is the provision of such an auxiliary grinder which can be removably connected to the outlet end of an ordinary meat grinder to operate upon the material as it is discharged therefrom.

Another object of the invention is the provision of such a comminutor which is rapid and thorough in its action and which has a large throughput and high efficiency.

A further object of the invention is the provision of such a comminutor which has a multiplicity of simultaneously acting cutting edges to insure thorough and complete reduction of the material as it passes therethrough.

A still further object of the invention is the provision of means for operating the comminutor independently of the grinder to which it may be attached.

A still further object of the invention is the provision of such a comminutor which can be readily disassembled for repairs or for cleaning to maintain sanitary conditions from one operation to the next.

Another and still further object is the provision of a comminutor which is rugged and capable of withstanding high internal pressures, such as when tough materials, like animal skins, are being acted upon.

Other objects and advantages of the invention and various features thereof will be apparent, in addition to those mentioned above, from the following description and the accompanying drawing considered conjunctively and to which drawing reference is made in the description.

Figure 1:
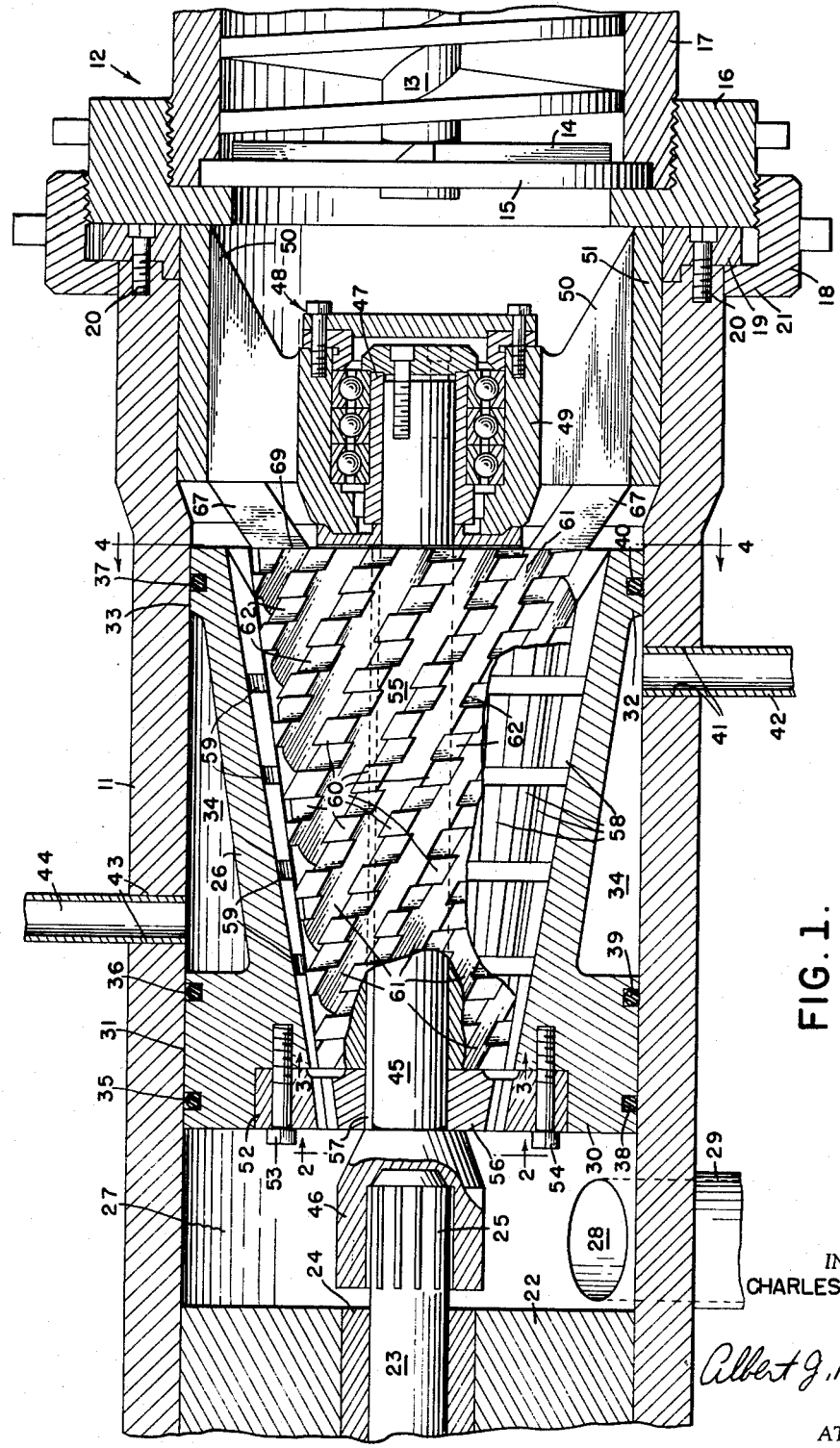
Fig. 1 is a longitudinal sectional view of an embodiment of the invention, partly broken away, attached to the end of an ordinary meat grinder, the grinder being shown fragmentarily.

Referring with more particularity to the drawing in which like numerals designate like parts, the embodiment illustrated comprises a cylindrical housing 11, one end of which is adapted to be removably coupled to an ordinary meat grinder 12 having the usual powered rotary feed screw 13, rotary cutter 14, plate 15 and flanged plate retainer ring 16 threadedly engaging the end of the grinder housing 17.

The comminutor housing 11 is provided with a coupling ring 18 which threadedly engages the ring 16 of the grinder. A retainer ring 19 is removably secured by bolts 20 to the end of the housing 11 to abut the flange 21 of the ring 18. By the use of such coupling rings of different diameters at the threaded end, grinders of different diameter sizes may be connected to the comminutor.

The opposite end of the comminutor is provided with a bearing wall 22, fragmentarily shown in Fig. 1. A powered shaft 23 projects through the center of this wall and is supported thereon by a bearing assembly 24. The shaft 23 has a splined end 25 on the interior of the housing 11.

Between the ends of the housing, there is disposed a frusto-conical shell or stator 26, the smaller diameter of which faces the end wall 22 and being spaced therefrom a distance to provide an enclosure for the splined end 25 and as a chamber 27 for the flow of comminuted material passing from the shell to a discharge opening 28 to which a discharge pipe 29 is connected. The wall at the smaller end of the shell 26 is bossed or enlarged to provide a solid flange 30 with a circular periphery 31 adjacent the inner wall of the housing 11. The opposite end of the shell is also provided with a flange 32 having a circular edge 33 against the inner wall of the housing 11. The annular space 34 between the shell 26 and the housing and between the flanges 30 and 32 comprise a jacket for heat exchange fluids, such as steam, hot water, cold water, or any other heat exchange medium desired. Sealing rings 35, 36, and 37 of rubber, cork or other suitable sealing material are provided in annular grooves 38, 39 and 40 at the periphery of the flanges 30 and 32 and in pressed contact with the housing 11.

The housing 11 is provided with a lower opening 41 for a pipe line 42 and upper opening 43 for another pipe line 44 for the purpose of passing a heat exchange fluid through the jacket.

Axially disposed within the shell 26 is a longitudinal shaft 45, one end of which is formed as a grooved socket 46 for engagement with the splined end 25 of the shaft 23. The opposite end of the shaft 45 is mounted in a sleeve 47 of a ball bearing assembly 48. The casing 49 of the ball bearing assembly is supported in a concentric position on three circumferentially spaced radial plates 50 secured to or integral with an annular sleeve insert 51 of the housing 11 adjacent the inlet or grinder end of the said housing.

An annular portion 52 at the narrower end of the shell 26 is separate from the remaining portion and is removably secured thereto by bolts 53 and 54.

Within the shell 26 there is disposed a relatively large frusto-conical rotary cutting member 55. A relatively small frusto-conical rotary cutting member 56 is also disposed adjacent the smaller end of the member 55. The width of the member 56 is substantially co-extensive with that of the portion 52, while the member 55 is axially co-extensive with the remaining portion of the conical shell 26.

The members 55 and 56 are removably fixed to the shaft 45 for rotation therewith by a key 57.

The inner surface of the shell or stator 26 is provided with longitudinal grooves 58 from one end to the other of the main portion and longitudinally spaced circular grooves 59 intersecting the grooves 58.

Cooperating with the grooves 58 and 59 is a grid formation of rhomboids 60 on the rotary member 55 formed by intersecting helical grooves 61 and transverse grooves 62. These rhomboids present sharp cutting edges at the corners of their acute dihedral angles to act upon material passing between the rotor 55 and stator 26.

Figure 2:
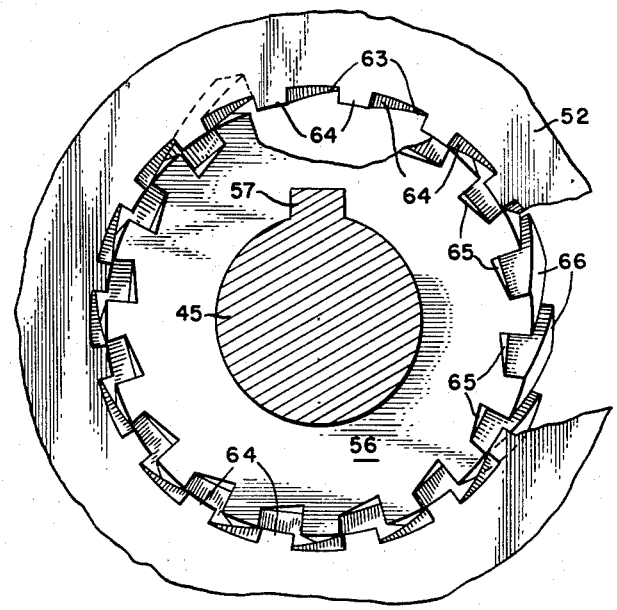
Fig. 2 is an enlarged section along the line 2—2 of Fig. 1 with a portion of the section broken away.
Figure 3:
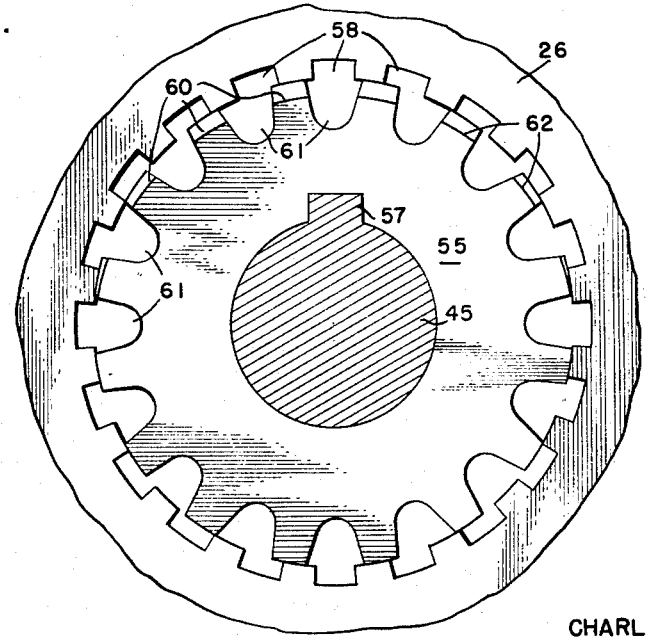
Fig. 3 is an enlarged section along the line 3—3 of Fig. 1.
Figure 4:
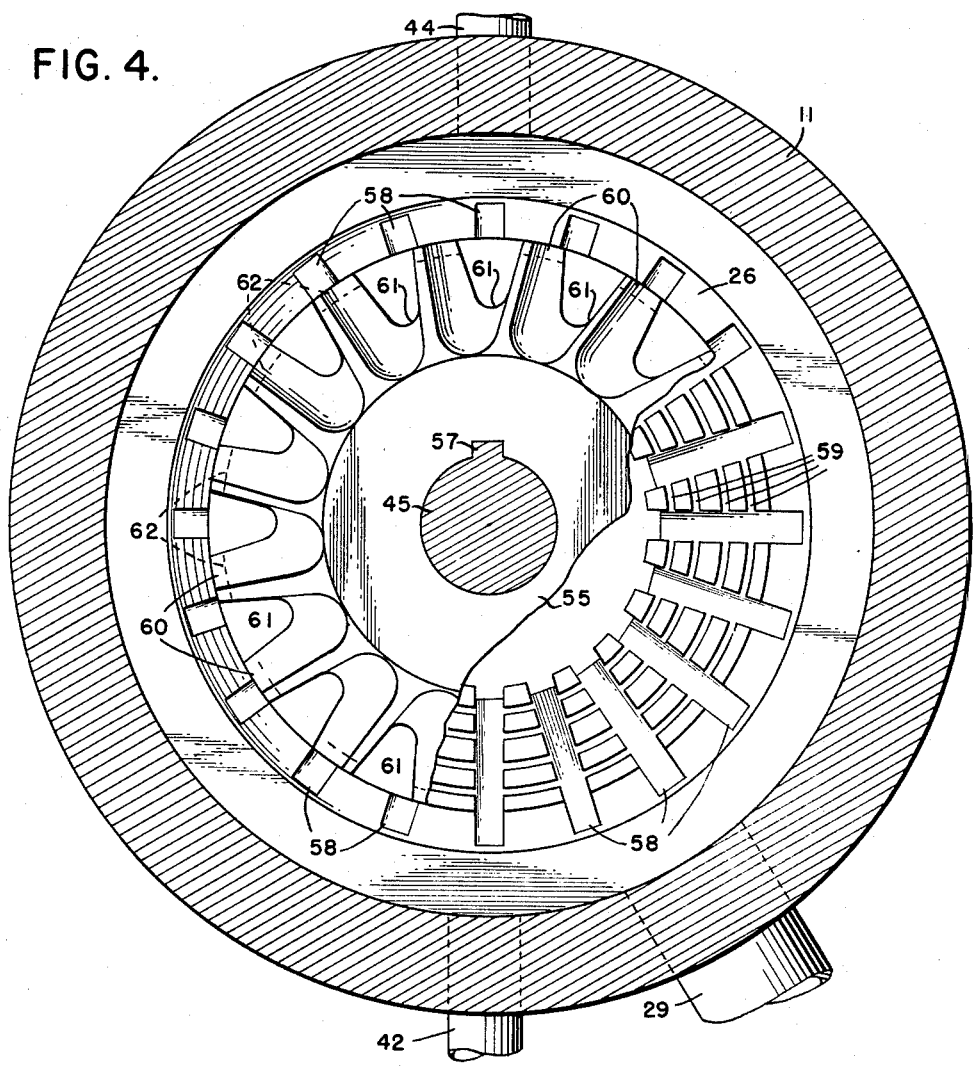
Fig. 4 is an enlarged section along the line 4—4 of Fig. 1.

The inner surface of the portion 52 is provided with circumferentially spaced diagonal grooves 63 forming short helical teeth 64. The adjacent outer surface of the member 56 is provided with oppositely disposed diagonal grooves 65 forming short helical teeth 66 crossing the grooves 63 and teeth 64. These teeth and grooves act on the material in a final comminuting action as the material is being discharged into the chamber 27. The effectiveness thereof is due to the scissors-like action between the teeth 64 and 66 as shown in Fig. 2 when the member 52 rotates and confining the material being comminuted within the grooves of the rotor and stator by the mutual engagement of the outer surfaces of the rotor and stator as shown in the various figures of the drawing.

Guide vanes 67, one for each of the radial plates 50, are secured to or extend as an integral part of the plates. They extend toward, and their outer edges 68 terminate, adjacent the end face 69 of the rotor 55. Thus, as the material flows past the edge of these vanes and enters the rotor 55, an initial shearing action is effected thereon to break up particles that are too large to enter the grooved spaces between the rotor and stator.

The device is easily disassembled for cleaning and for repairs by disconnecting the grinder, removing the bearing assembly and its mounting sleeve, and then removing the rotors 55 and 56 and shaft 45. Reassembly is very simply accomplished by reversing this procedure in order.

Having thus described my invention, I claim:

1. A comminutor comprising a stationary tubular member having an interior frusto-conical wall, a complementary frusto-conical rotary member within said tubular member adjacent said wall, said stationary and rotary members having their adjacent lateral surfaces in mutual engagement, means, including a shaft, for rotatably supporting the rotary member in interface contact with the stationary member, said rotary member having intersecting grooves on its periphery forming a multiplicity of spaced cutting edges in a grid formation on the surface thereof, said wall having its adjacent periphery provided with intersecting circumferential and annular grooves, whereby material introduced between said stationary and rotary members is confined in the spaces within said grooves and are subjected to the cutting action of said cutting edges during rotation of the rotary member.

2. A comminutor comprising a stationary tubular member having an interior frusto-conical wall, a complementary frusto-conical rotary member within said tubular member adjacent said wall, said stationary and rotary members having their adjacent lateral surfaces in mutual engagement, means, including a shaft, for rotatably supporting the rotary member in interface contact with the stationary member, said rotary member having intersecting grooves on its periphery forming a multiplicity of spaced cutting edges in a grid formation on the surface thereof, said wall having an adjacent periphery provided with intersecting circumferential and annular grooves, said wall and rotary member each including portions at their narrower ends, said portions having peripheral surfaces radially adjacent to each other and having diagonal grooves along said peripheries forming helical teeth, the grooves being disposed so that the teeth formed thereby on one portion are in crossed relation relative to the teeth on the other portion, whereby material introduced between said stationary and rotary members is confined in the spaces within said grooves and are subjected to the cutting action of said cutting edges during rotation of the rotary member.

3. A comminutor comprising a stationary tubular member having an interior frusto-conical wall, a complementary frusto-conical rotary member within said tubular member adjacent said wall, said stationary and rotary members having their adjacent lateral surfaces in mutual engagement, means, including a shaft, for rotatably supporting the rotary member in interface contact with the stationary member, said shaft being connected for co-rotation with the rotary member, a powered shaft axially disposed relative to the supporting shaft, means for coupling the said shafts together, said rotary member having intersecting grooves on its periphery forming a multiplicity of spaced cutting edges in a grid formation on the surface thereof, said wall having on its periphery intersecting circumferential and annular grooves, whereby material introduced between said stationary and rotary members is confined in the spaces within said grooves and are subjected to the cutting action of said cutting edges during rotation of the rotary member.

4. A comminutor comprising a stationary tubular member having an interior frusto-conical wall, a complementary frusto-conical rotary member within said tubular member adjacent said wall, said stationary and rotary members having their adjacent lateral surfaces in mutual engagement, means, including a shaft, for rotatably supporting the rotary member in interface contact with the stationary member, said shaft being connected for co-rotation with the rotary member, a powered shaft axially disposed relative to the supporting shaft, means for coupling the said shafts together, a bearing wall in the tubular member for said powered shaft, said wall being disposed in spaced relation to and axially of the rotating member and conical wall and forming therebetween a material discharge chamber.

5. A comminutor comprising a stationary tubular member having an interior frusto-conical wall, a complementary frusto-conical rotary member within said tubular member adjacent said wall, said stationary and rotary members having their adjacent lateral surfaces in mutual engagement, means, including a shaft, for rotatably supporting the rotary member in interface contact with the stationary member, said rotary member having intersecting grooves on its periphery forming a multiplicity of material passages and a multiplicity of spaced cutting edges in a grid formation on the surface thereof, said wall having an adjacent periphery provided with intersecting circumferential and annular grooves, whereby material introduced between said stationary and rotary members is confined in the spaces within said grooves and are subjected to the cutting action of said cutting edges during rotation of the rotary member, said tubular member and conical wall having portions thereof spaced apart and comprising a jacket for holding heat exchange fluid.

6. A comminutor as defined by claim 5 having inlet and outlet means for the jacket.

7. A comminutor comprising a stationary tubular member having an interior frusto-conical wall, a complementary frusto-conical rotary member within said tubular member adjacent said wall, said stationary and rotary members having their adjacent lateral surfaces in mutual engagement, means, including a shaft for rotatably supporting the rotary member, in interface contact with the stationary member, said shaft being connected for co-rotation with the rotary member, a powered shaft axially disposed relative the supporting shaft, means for coupling the said shafts together, a bearing wall in the tubular member for said powered shaft, said wall being disposed in the housing in spaced relation to and axially of the narrower end of the rotating member and conical wall and forming therewith and with the tubular member a material discharge chamber, a bearing assembly within the housing for supporting the opposite end of the supporting shaft on the opposite end of the said rotary member, said bearing assembly being axially spaced from the rotary member and removable means for supporting the bearing assembly in the housing.

8. A comminutor as defined by claim 7 in which the removable means includes a stationary sleeve ring, surrounding the bearing and removably engaged with the inner wall of the tubular member, and radial supporting members connecting said sleeve to the bearing assembly.

9. A comminutor as defined by claim 8 and vanes carried by the radial member, said vanes projecting toward the rotary member and having edges adjacent the wider end wall of the rotary member.

10. A machine for comminuting material comprising a hollow frusto-conical stator and a corresponding frusto-conical rotor within the stator, said stator and rotor having their adjacent lateral surfaces in mutual engagement with each other, said stator and rotor each having intersecting grooves at their respective lateral surfaces providing passages through which material is confined in moving between the ends of the rotor and stator, said intersecting grooves being so disposed as to form a multiplicity of cutting edges.

11. A machine for comminuting material cmprising a hollow frusto-conical stator and a corresponding frusto-conical rotor within the stator, said stator and rotor having their adjacent lateral surfaces in mutual engagement with each other and each having intersecting grooves at their respective lateral surfaces providing passages through which material is confined in moving between the ends of the rotor and stator, means independent of the rotor and stator for forcing material through said grooves from the larger diameter ends of the rotor and stator to the smaller diameter ends, said intersecting grooves being so disposed as to form a multiplicity of cutting edges.

12. A machine for comminuting material comprising a hollow frusto-conical stator and a corresponding frusto-conical rotor within the stator, said stator and rotor having their adjacent lateral surfaces in mutual engagement with each other, said stator and rotor each having intersecting grooves at their respective lateral surfaces providing passages through which material is confined in moving between the ends of the rotor and stator, said intersecting grooves being disposed relative to each other so as to form a multiplicity of rhomboids having acute dihedral angles facing the direction of rotation of the rotor relative to the stator.

13. A machine for comminuting material comprising a hollow frusto-conical stator and a corresponding frusto-conical rotor within the stator, said stator and rotor having their adjacent lateral surfaces in mutual engagement with each other, said stator having longitudinal grooves adjacent the rotor providing passages for the flow of material between the ends thereof, and transverse grooves interconnecting said passages, said rotor having a plurality of intersecting grooves adjacent the stator, said intersecting grooves being so disposed relative to each other as to form a multiplicity of cutting edges.

References Cited in the file of this patent

UNITED STATES PATENTS

| Number | Name | Date |
|---|---|---|
| 526,203 | Schwarzenberger | Sept. 18, 1894 |
| 1,904,884 | Royle | Apr. 18, 1933 |
| 2,133,756 | Rodgers | Oct. 18, 1938 |
| 2,305,467 | Davis et al. | Dec. 15, 1942 |